Sept. 11, 1962 N. A. LIKELY ETAL 3,053,279
DIRECTIONAL VALVE
Filed April 6, 1960 4 Sheets-Sheet 1
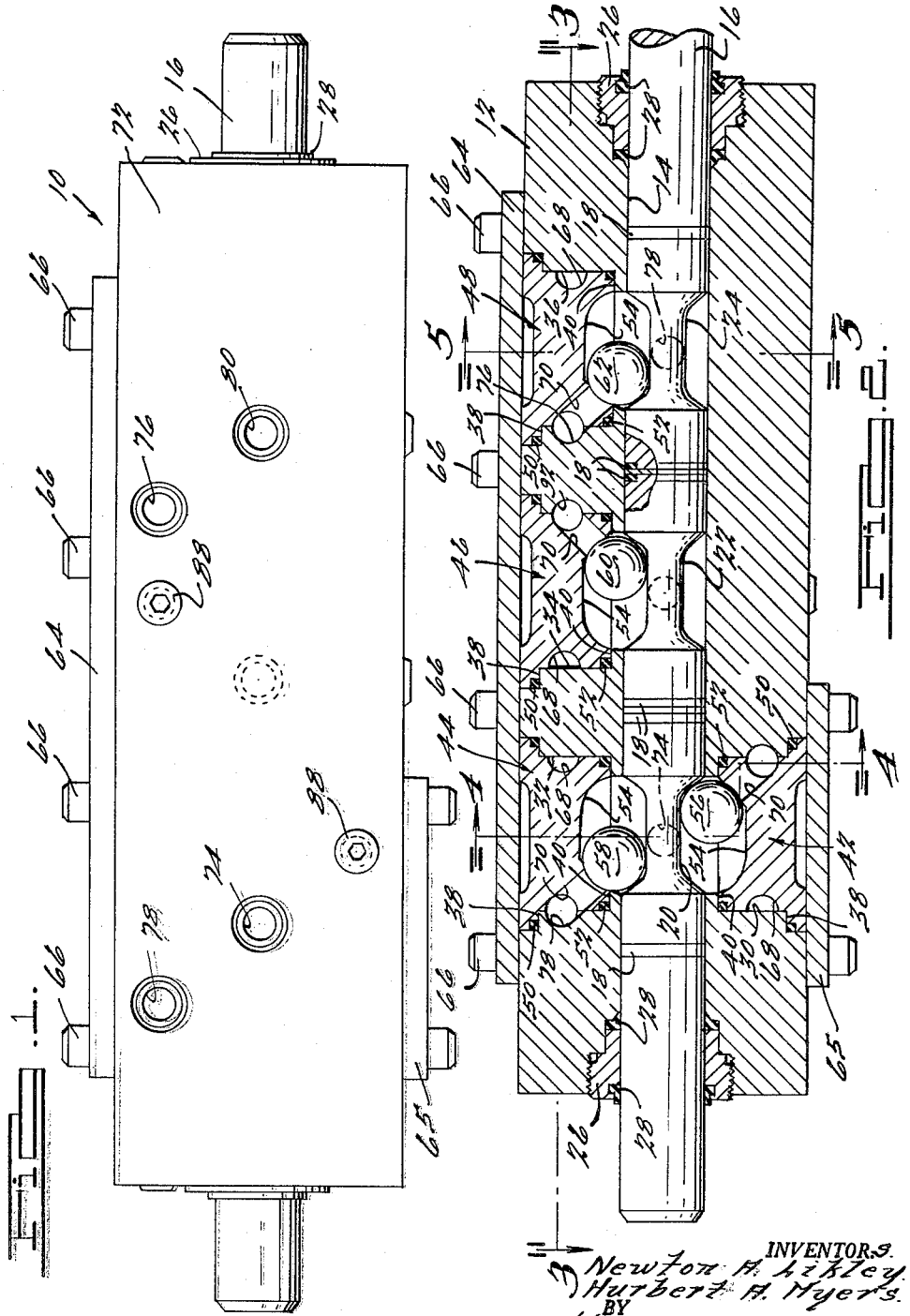
INVENTORS.
Newton A. Likely
Hurbert A. Myers
BY
Harness, Dickey & Pierce
ATTORNEYS

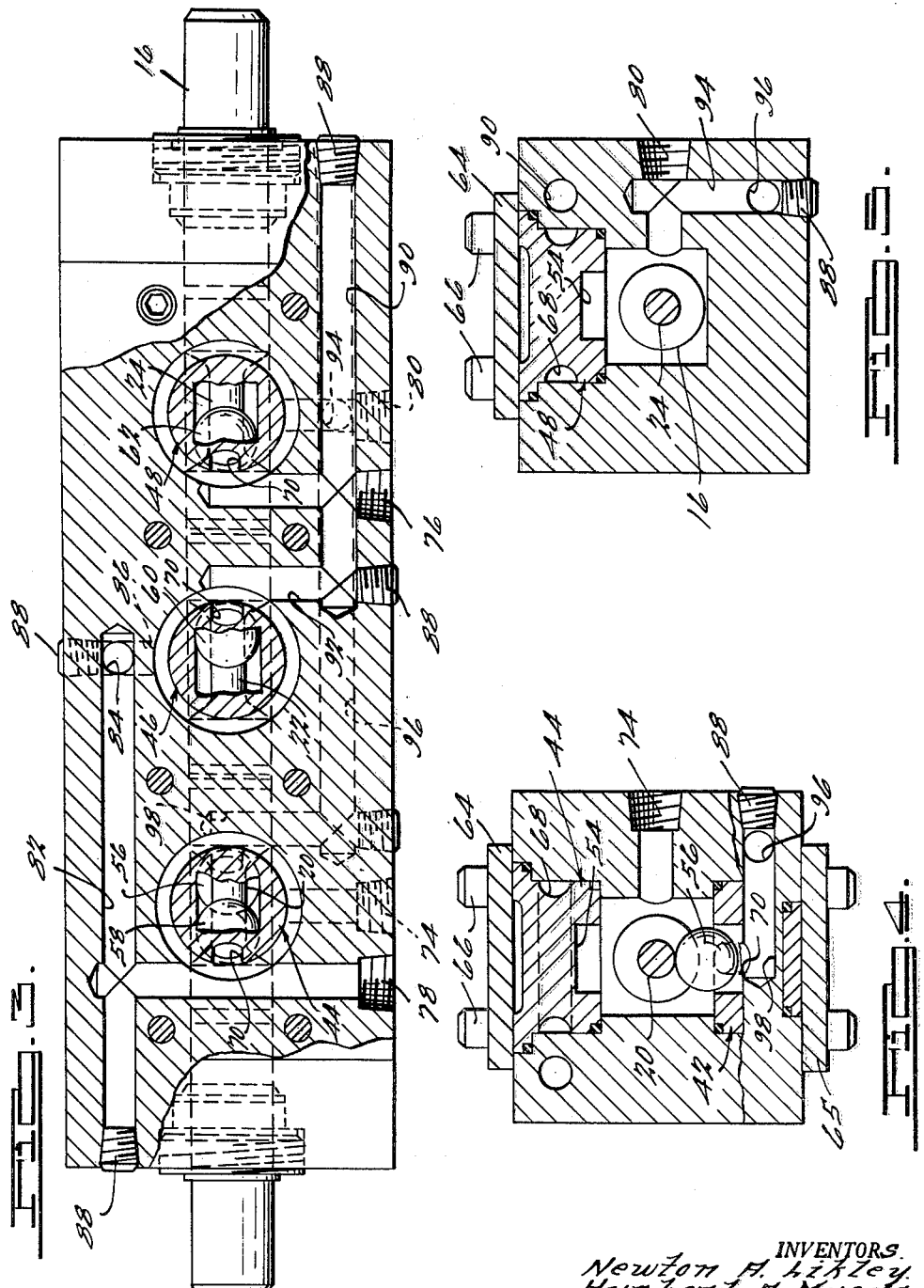

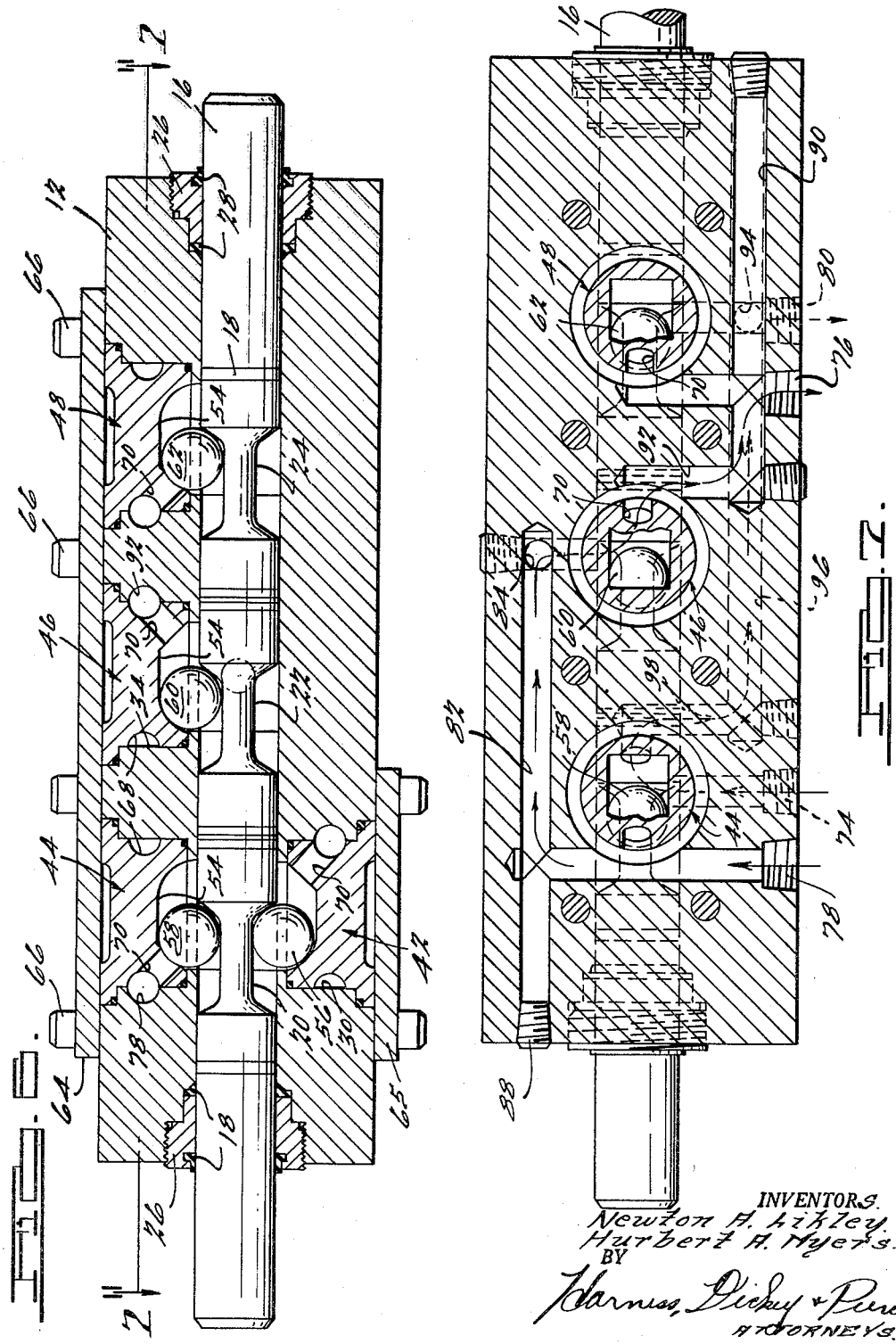

Sept. 11, 1962   N. A. LIKELY ETAL   3,053,279
DIRECTIONAL VALVE
Filed April 6, 1960   4 Sheets—Sheet 4
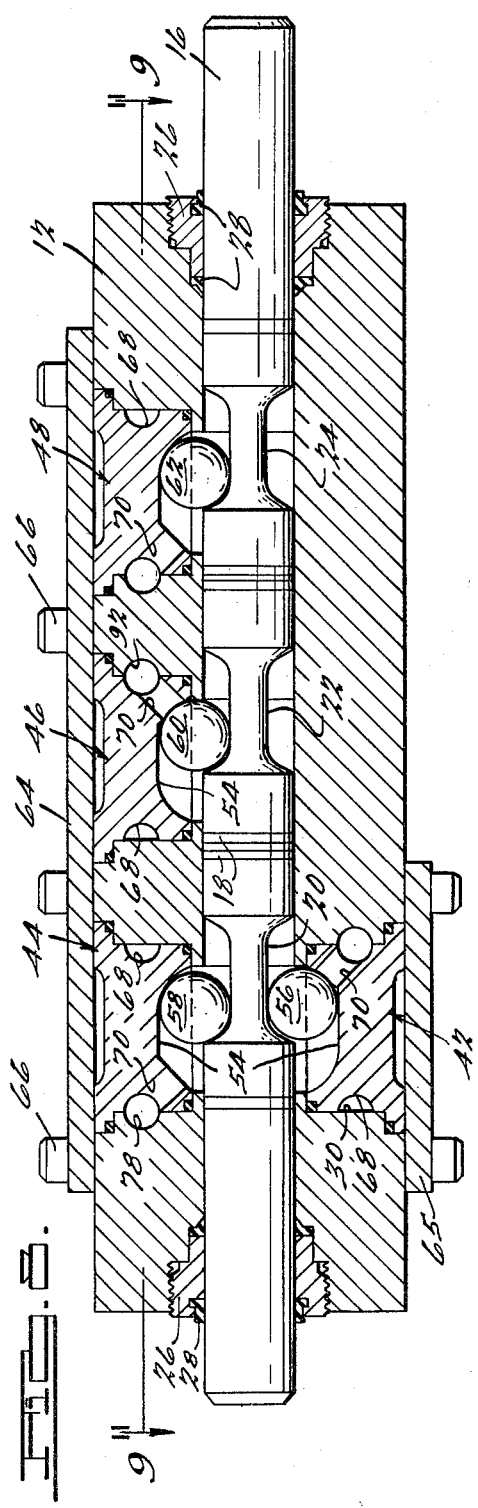
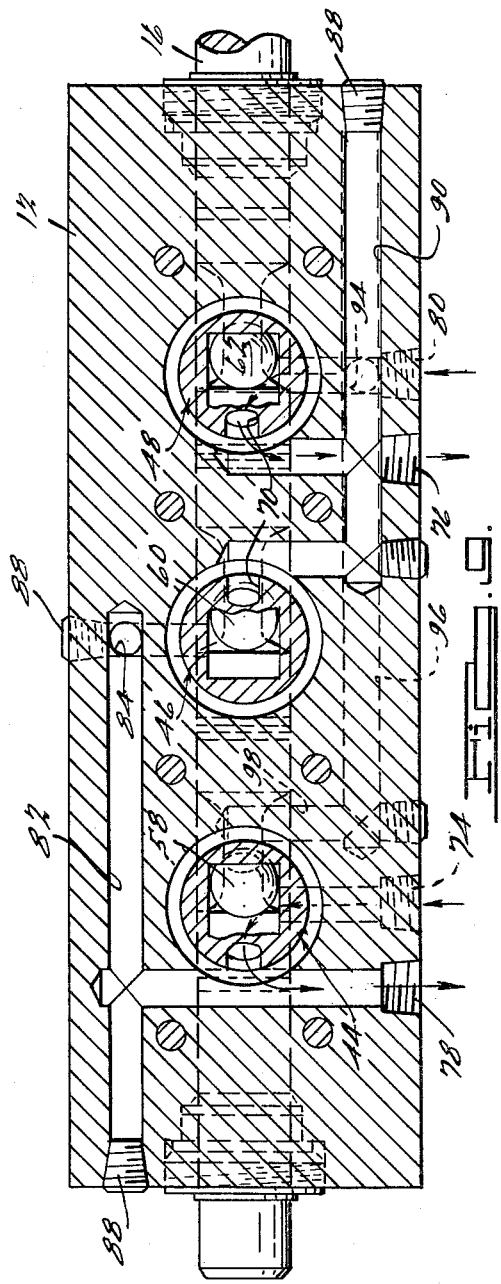
INVENTORS.
Newton A. Likely.
Hubert A. Myers.
BY
Harness, Dickey & Pierce.
ATTORNEYS United States Patent Office 3,053,279
Patented Sept. 11, 1962

3,053,279
DIRECTIONAL VALVE
Newton A. Likely, Gardena, and Hubert A. Myers, Los Angeles, Calif., assignors to Raymond De-Icer & Engineering Co., Inc., Huntington Park, Calif., a corporation of California
Filed Apr. 6, 1960, Ser. No. 20,441
7 Claims. (Cl. 137—622)

This invention relates to valves and particularly to a directional valve having one or more balls therein shiftable in a predetermined manner to control the flow of pressurized fluid through the valve.

In accordance with the present invention, one or more balls are used to control the flow of fluid through a valve. Each of the balls is disposed within a chamber or recess within the valve and is adapted to seat against and seal off the end of a passageway within the valve communicating with the chamber. The balls are maintained in their seated position by the pressure of fluid within the chamber in which they are disposed and are selectively moved out of seating position by a shiftable member to permit the fluid to flow from the chamber and out through the passageway associated with the ball. When the shiftable member is disengaged from the ball the flow of fluid from the chamber and out through the passageway is utilized to again move the ball into seating position to again seal off the end of the passageway. In certain cases, it may be desirable to incorporate a spring to aid in returning each ball to its seated position.

In the illustrated embodiment of the present invention, many components of a conventional spool valve are employed, and the spool is utilized as the member for shifting the balls out of their seated position. Each of the balls is engaged by the spool with what may be designated as a lost motion connection so that some of the balls can be shifted out of their seated position when the spool is shifted in one direction from its neutral position, and the remaining balls can be shifted out of their seated position when the spool is shifted in the opposite direction. The spool merely operates to move the balls out of their seated position and is not used to move them back into seated position and when the direction of movement of the spool is reversed, the spool releases the balls that it has shifted so that each ball is free to move back into its seated position in response to the fluid flow from the chamber in which it is disposed as previously described.

It is one object of the invention to provide a directional valve for controlling the flow of fluid between various ports in a manner to substantially eliminate leakage between ports which are not communicated with one another by the valve.

It is another object of the invention to provide a spool valve having one or more balls therein which are shiftable by the spool in a predetermined manner to communicate various ports of the valve with one another, the balls seating against the ends of passageways within the valve to seal off nonaligned ports in a substantially leak-tight manner.

It is a further object of the invention to provide a spool valve having a plurality of balls therein which are shifted by the spool and which cooperate with a plurality of removable seats in the valve to control the flow of pressurized fluid through the valve.

It is a still further object of the invention to provide a directional valve for controlling the flow of fluid between a first and second passageway communicating with a chamber within the valve by means of a ball disposed within said chamber and moved into sealing engagement with said first passageway by the flow of fluid from said second passageway through said chamber and out said first passageway, a suitable member being provided for moving the ball out of seating engagement with said first passageway to communicate the two passageways with one another so that fluid may flow therethrough again.

It is a still further object of the invention to provide a directional valve for controlling the flow of fluid between first, second and third passageways communicating with a chamber within the valve by a pair of balls, one ball being normally moved into sealing engagement with said first passageway and the other ball being moved into sealing engagement with said second passageway by the flow of fluid from said third passageway through said chamber and out said first and second passageways, a suitable member being provided for selectively shifting said one ball out of sealing engagement to communicate said first and third passageways when moved in one direction and shifting said other ball out of sealing engagement to communicate said second and third passageways when moved in the other direction.

It is a still further object of the invention to provide a valve having one or more balls shiftable by the spool to control the flow of pressurized fluid therethrough which is rugged and effective in use, economical to manufacture, actuated in the same manner as a conventional spool valve, easy to assembly and disassemble, and wherein the elements thereof subject to wear can be readily replaced.

It is a still further object of the invention to provide a valve of the aforementioned type which is easily adapted for remote control by pilot cylinders or solenoids which will operate efficiently whether it be used in a gaseous system or a liquid system and in which check valves may be incorporated to prevent creeping of any control units in view of the fact that fluid flows in only one diretcion through each valve passageway leading from a valve seat.

Other objects and features of novelty of the invention will be specifically pointed out or otherwise become apparent when referring, for a better understanding of the invention, to the following description taken in conjunction with the accompanying drawings wherein:

FIGURE 1 is a longitudinal side view of a valve embodying features of the invention;

FIG. 2 is a longitudinal sectional view of the valve illustrated in FIG. 1;

FIG. 3 is a sectional view taken along the line 3—3 of FIG. 2;

FIG. 4 is a sectional view taken along the line 4—4 of FIG. 2;

FIG. 5 is a sectional view taken along the line 5—5 of FIG. 2;

FIG. 6 is a longitudinal sectional view similar to that of FIG. 2, illustrating the valve with the spool thereof shifted to the left;

FIG. 7 is a sectional view taken along the line 7—7 of FIG. 6.

FIG. 8 is a sectional view similar to that of FIG. 2, illustrating the valve spool shifted to the right; and FIG. 9 is a sectional view taken along the line 9—9 of FIG. 8.

Referring to FIGS. 1–5, a four-way directional valve 10 embodying features of the present invention is illustrated which is comprised of a valve body 12 having a central bore 14 extending longitudinally therethrough with a spool 16 slidably sealed in the bore. A plurality of sealing rings 18, preferably made of Teflon or the like, are mounted on the spool to improve the seal against the bore 14, and a plurality of annular grooves 20, 22 and 24 are formed on the spool between each of the rings 18. Suitable end plugs 26 are screwed into each end of the valve body with sealing rings 28 of Teflon, or other suitable material, disposed adjacent to the ends thereof to slidably seal against the spool 16.

The valve body has a plurality of laterally extending bores 30, 32, 34 and 36 formed therein which are each counterbored to provide outwardly presenting annular shoulders 38 and 40. The bores 30 and 32 communicate with the central bore adjacent to the annular groove 20, the bore 34 adjacent to the annular groove 22 and the bore 36 adjacent to the annular groove 24. A plurality of shouldered cylindrical seats 42, 44, 46 and 48 are disposed within each of the laterally extending bores 30, 32, 34 and 36, respectively, with O-rings 50 and 52 provided between the seats and each of the annular shoulders 38 and 40 to seal therebetween.

Each of the seats has a longitudinally extending groove 54 in the face thereof communicating with the central bore 14 and overlying the annular groove adjacent thereto. A plurality of balls 56, 58, 60 and 62 are disposed within the longitudinal grooves of each of the seats 42, 44, 46 and 48, respectively, and are positioned so that when the spool 16 is shifted to the left as viewed in FIG. 2, it will shift the balls 56 and 60 to the left, and when the spool is shifted to the right, it will shift the balls 58 and 62 to the right. A plate 64 is secured to the upper face of the valve body by a plurality of bolts 66 or the like, and a plate 65 is secured to the underside thereof to fix the seats within the valve body. Each of the seats is also provided with a semicylindrical annular groove 68 in the outer surface thereof, and an angled drilled passageway 70 which communicates the annular groove 68 with one end of the longitudinally extending groove 54.

The face 72 of the valve body 12 is provided with a pressure port 74, a tank port 76 and two cylinder ports 78 and 80. As most clearly illustrated in FIGS. 3–5, the pressure port 74 communicates directly with the chamber adjacent to the annular groove 20 of the spool. The cylinder port 78 communicates with the annular groove 68 in the periphery of the seat 44 and extends into a longitudinally extending drilled passageway 82. The right end of the drilled passageway 82 (as viewed in FIG. 3) communicates with a laterally extending drilled passageway 84 which, in turn, communicates with a drilled passageway 86 which communicates directly with the chamber adjacent to the annular groove 22 of the spool. Suitable threaded plugs 88 are fixed within the ends of the drilled passageways 82 and 86 which communicate with the faces of the valve body 12 to seal them off.

The tank port 76 extends through a drilled passageway 90 and communicates directly with the annular groove 68 in the periphery of the seat 48. The left end of the drilled passageway 90 communicates with a laterally extending passageway 92 which communicates with the annular groove 68 in the periphery of the seat 46. As before, suitable threaded plugs 88 are provided for sealing off the open ends of the drilled passageways 90 and 92. The cylinder port 80 communicates directly with the chamber adjacent to the annular groove 24 and also communicates with a laterally extending drilled passageway 94 having a threaded plug 88 fixed within the lower end thereof. The passageway 94 communicates with a longitudinally extending passageway 96, the left end of which (as viewed in FIG. 3) communicates with a laterally extending passageway 98. One end of the passageway 98 communicates with the annular groove 68 on the periphery of the seat 42 and the other end thereof is sealed by a threaded plug 88.

As illustrated in FIG. 2, the spool 16 is in its neutral position and each of the balls is seated against and seals off the opening of the angled passageway 70. As can be most clearly seen in FIGS. 6 and 8, the end of the longitudinal groove 54 with which each angled passageway 70 communicates is flat and the angled passageway extends perpendicular thereto so that the opening thereof communicating with the groove is round. This, of course, enables the ball associated therewith to seat against and seal off this opening in a manner to positively prevent leakage.

When the spool is in its neutral position as illustrated in FIG. 2, each of the angled passageways 70 is sealed off by their respective ball so that the pressure, tank and cylinder ports 74, 76, 78 and 80 are each blocked off. The pressure port 74 pressurizes the chamber adjacent to the annular groove 20 on the spool 16 to hydraulically bias the balls 56 and 58 tightly against their seats and thus assure a leak-tight seal. The cylinder ports 78 and 80 communicate with the chambers adjacent to the annular grooves 22 and 24 on the spool, respectively, and the angled passageways 70 of the seats 46 and 48 communicate directly with the tank port 76. Consequently, no force will act on the balls 60 and 62 to move them out of seated position and the pressure within these chambers will maintain the balls 60 and 62 in firm setting engagement to ensure that the angled passageways 70 of the seats 46 and 48 are tightly sealed off.

The angled passageways 70 of the seats 42 and 44 will also be exposed to the same pressure as the cylinder ports 80 and 78, respectively, but the balls 56 and 58 will still be biased firmly into seating position since the chamber adjacent to the annular groove 20 on the spool is exposed to the pressure of the pressure port 74, as previously described, and this pressure acts on the major portion of the surface area of the balls 56 and 58.

When the spool 16 is shifted to the left as illustrated in FIGS. 6 and 7, the balls 58 and 62 remain seated and the balls 56 and 60 are shifted to the left to expose the angled passageways 70 associated therewith. In this position the pressure port 74 is communicated with the cylinder port 80 along the path indicated by the dotted arrows in FIG. 7, and the cylinder port 78 is communicated with the tank port 76 along the path indicated by the solid arrows. Therefore, pressurized fluid will flow from the pressure port 74, into the chamber adjacent to the annular groove 20, out through the angled passageway 70 of the seat 42, through the drilled passageways 98, 96, 94 and out through the cylinder port 80. Likewise, the fluid will flow from the cylinder port 78, through the drilled passageways 82, 84 and 86, into the chamber adjacent to the annular groove 22 on the spool, out through the angled passageway 70 of the seat 46, through the drilled passageways 92 and 90 and out through the tank port 76.

With the fluid passing through the valve 10 in this manner, the balls 58 and 62, which are the only ones sealing off angled passageways 70, are still hydraulically biased into seating engagement. The major surface area of the ball 58 is exposed to the pressure of the pressure port 74 with the remaining portion thereof being exposed to the angled passageway 70 which communicates with the cylinder port 78. Likewise, since the chamber adjacent to the annular groove 24 on the spool 16 communicates directly with the cylinder port 80, it is at the same pressure as the pressure port 74 while the remaining portion of the surface area of the ball 62 is exposed to the angled passageway 70 which communicates with the tank port 76.

When the valve spool 16 is shifted to the right as viewed in FIGS. 8 and 9, each of the balls 56, 58, 60 and 62 is also shifted to the right, the balls 56 and 60 moving into seating engagement and closing off their respective angled passageways and the balls 58 and 62 being moved out of seating engagement to open their respective angled passageways 70. In this position, the pressure port 74 communicates with the cylinder port 78 along the path indicated by the arrows on the left in FIG. 9, and the cylinder port 80 communicates directly with the tank port 76 along the path indicated by the arrows on the right. To trace these paths, the pressurized fluid flows from the pressure port 74 into the chamber adjacent to the annular groove 20, through the angled passageway 70 of the seat 44 and out through the cylinder port 78. Fluid also flows from the cylinder port 80 into the chamber adjacent to the annular groove 24, through the angled passageway 70 of the seat 48 and out through the tank port 76.

With the spool 16 shifted to the right in this manner, the chambers adjacent to the annular grooves 20 and 22 are both exposed to the pressure of the pressure port 74 which hydraulically biases the balls 56 and 60 into firm seating engagement, as previously described. When the spool 16 is returned to its neutral position as illustrated in FIG. 2, the balls 56 and 60 remain seated because of the hydraulic biasing force, and the balls 58 and 62 are free to move to the left into seating position. It will be observed that the spool 16 does not engage and shift the balls 58 and 62 to the left when it returns to its neutral position. However, as soon as these balls are disengaged by the spool in this manner, the fluid passing from the chambers adjacent to the annular grooves 20 and 24 and out through the angled passageways 70 associated therewith will draw the balls to their seated positions (as illustrated in FIG. 2) so that they will seal against and interrupt this flow. Likewise, when the valve spool 16 is shifted from the position illustrated in FIG. 6 back to its neutral position, the balls 58 and 62 will remain seated because both the chambers adjacent to the annular grooves 20 and 24 are pressurized by the pressure port 74, and the fluid flowing out through the angled passageways 70 of the seats 42 and 46, will move the balls 56 and 60 into seating engagement.

From the foregoing, it will be seen that the preferred embodiment of the present invention provides a leak-tight, four-way directional valve wherein the major components are the same as those of a conventional spool valve and wherein the newly added elements (the balls and seats) can be easily assembled and replaced. However, it is to be specifically understood that, although the preferred embodiment disclosed and described herein, illustrates the balls and saets and other features of the present invention as applied to a four-way directional valve, they also can be employed in other types of valves, including three-way, two-way and one-way valves.

While it will be apparaent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A directional valve comprising a valve body having a chamber therein, port and passageway means in said body including first and second passages communicating with said chamber at spaced positions, a ball disposed within said chamber and adapted to seat against the open end of said first passageway to seal it off, a spool slidingly sealed within said chamber, means defining a groove in said spool, said ball disposed partially in said groove, said groove extending longitudinally along said spool a greater distance than the diameter of said ball, said spool selectively engaging said ball to move it from its seated position wherein it seals off said first passageway to a second position wherein it does not seal off the first passageway and disengaging said ball to enable it to be moved back into its seated position in response to fluid flowing from said second passageway into said chamber and out said first passageway whereby the communication between the first and second passageway is controlled by the position of said ball, and means including said second passageway enabling said ball to sealingly engage said first passageway when said ball is in its seated position.

2. A directional valve comprising a valve body having a chamber therein, port and passageway means in said body including first, second and third passageways communicating with said chamber at spaced positions, a pair of balls disposed within said chamber, one of said balls being adapted to seat against the open end of said first passageway to seal it off and the other said balls being adapted to seat against the open end of said second passageway to seal it off, a spool slidingly sealed within said chamber, means defining a groove in said spool, said balls being disposed partially in said groove, said groove extending longitudinally along said spool a distance greater than the diameter of either of said balls, said spool being movable in one direction from a neutral position to a first position and movable in another direction from said neutral position to a second position, said balls both being seated against their respective passageways when said shiftable means is in said neutral position, said spool moving said one ball from its seated position when shifted to said first position to communicate said first and third passageways with one another, and said spool moving said other ball from its seated position when moved to said second position to communicate said second and third passageways with one another, means including said third passageway pressurizing said chamber for maintaining said ball in sealing engagement with said first passageway when said ball is in its seated position.

3. A spool valve comprising a valve body having a longitudinally extending bore therein, a spool slidably disposed in said bore, a plurality of spaced recesses in said valve body communicating with said bore, a ball disposed in each of said recesses for movement between a first and second position, and port and passageway means in said body including a first separate passageway communicating with each of said recesses, a second separate passageway communicating with each of said recesses, each of said balls sealing off the first passageway communicating with the recess associated therewith when in its first position and moving out of sealing engagement with the passageway when in its second position, each of said balls being disposed in their first position when said spool is in a neutral position, said second passageway pressurizing said recess for maintaining said ball in sealing engagement with said first passageway when said ball is in its seated position, said spool moving some of said balls to their second position when shifted in one direction and moving other balls to their second position when shifted in the opposite direction whereby the valve spool can be shifted to control the flow of fluid through said port and passageway means.

4. A spool valve comprising a valve body having a longitudinally extending central bore therein, a spool having an annular groove therein slidably disposed in said central bore, means on said spool adjacent each end of said annular groove preventing leakage between the said spool and said valve body, a recess in said body communicating with said bore at a position adjacent to said annular groove on the spool, port and passageway means in said body including a first passageway communicating with said recess and a second passageway communicating with the chamber defined by said central bore and the annular groove on the spool, and a ball disposed partially within said recess and partially within said annular groove, said ball being shiftable by said spool from a seated position wherein it seals off the end of said first passageway to a second position wherein it does not seal off the first passageway.

5. The invention as defined in claim 4 wherein the width of said annular groove is substantially greater than the diameter of said ball.

6. A spool valve comprising an elongated valve body having a central bore extending longitudinally therethrough, a spool having a plurality of longitudinally spaced annular grooves slidably sealed within said central bore, said valve body having a plurality of laterally extending bores therein communicating said central bore with the outer surface of the valve body, a removable seat fixed within each of said lateral bores and having a longitudinally extending groove on the face thereof communicating with said central bore, said spool having a neutral position and being shiftable in one direction to a first position and in the opposite direction to a second position, each of said longitudinal grooves overlying one of said annular grooves when said spool is in said neutral position, a ball disposed between each seat and the spool in the space defined by the annular groove of the spool and the longitudinal groove of the seat, port and passageway means in said body including a passageway in each of said seats opening on the longitudinal grooves thereof, each of said balls sealing off the passageway in the seat associated therewith when the spool is in said neutral position, said spool shifting some of the balls out of sealing engagement when moved to its first position and moving the remaining balls out of sealing engagement when moved to said second position.

7. A four-way spool valve comprising an elongated valve body having a central bore extending longitudinally therethrough, a spool having a plurality of longitudinally spaced annular grooves slidably sealed within said central bore, said valve body having four laterally extending bores therein communicating said central bore with the outer surface of the valve body, first and second ones of said laterally extending bores communicating with the central bore at a position adjacent to a first one of said annular grooves, the third and fourth laterally extending bores communicating with said central bore at positions adjacent to the second and third annular grooves respectively, a removable seat having an annular groove in the outer periphery thereof fixed within each of said laterally extending bores, each of said seats having a longitudinally extending groove on the face thereof communicating with said central bore and an angled passageway communicating the annular groove thereof with one end of the longitudinally extending groove, a ball disposed between each seat and the spool in the space defined by the annular groove of the spool and the longitudinal groove of the seat, each of said balls sealing off the angled passageway of the seat associated therewith when said spool is in a neutral position, said valve body having a pressure port and a tank port and first and second cylinder ports communicating with one face thereof, said pressure port communicating with the chamber within said central bore adjacent to said first annular groove and said second cylinder port communicating with the chamber within the central bore adjacent to said third annular groove, said first cylinder port communicating with the annular groove in said first seat and with the chamber within said central bore adjacent to said second annular groove, said tank port communicatnig with the annular grooves on the peripheries of said third and fourth seats, and passageway means communicating said second cylinder port with the annular groove on the periphery of said second seat, the angled passageways in said first and fourth seats opening on corresponding ends of the longitudinal grooves thereof and the angled passageways of said second and third seats opening on the corresponding ends of the longitudinal grooves thereof opposite to the ends which the angled passageways of the first and fourth seats open on, said spool moving the balls associated with said second and third seats out of sealing position when moved in one direction and moving the balls associated with said first and fourth seats out of sealing engagement when moved in the other direction.

References Cited in the file of this patent
UNITED STATES PATENTS

| | | |
|---|---|---|
| 2,232,038 | Stone et al. | Feb. 18, 1941 |
| 2,574,335 | Leduc | Nov. 6, 1951 |
| 2,753,730 | Ashton et al. | July 10, 1956 |
| 2,781,781 | Hruska | Feb. 19, 1957 |
| 3,007,492 | Grimmer | Nov. 7, 1961 |